(12) United States Patent
Misawa et al.

(10) Patent No.: US 12,101,014 B2
(45) Date of Patent: Sep. 24, 2024

(54) ROTARY ELECTRIC MOTOR

(71) Applicants: Sanyo Denki Co., Ltd., Tokyo (JP); Japan Aviation Electronics Industry, Ltd., Tokyo (JP)

(72) Inventors: Yasushi Misawa, Tokyo (JP); Manabu Horiuchi, Tokyo (JP); Mai Shimizu, Tokyo (JP); Takashi Matsushita, Tokyo (JP); Tomoyuki Suzuki, Tokyo (JP)

(73) Assignees: Sanyo Denki Co., Ltd., Tokyo (JP); Japan Aviation Electronics Industry, Ltd., Tokyo (JP)

( * ) Notice: Subject to any disclaimer, the term of this patent is extended or adjusted under 35 U.S.C. 154(b) by 252 days.

(21) Appl. No.: 17/771,092

(22) PCT Filed: Dec. 10, 2020

(86) PCT No.: PCT/JP2020/046034
§ 371 (c)(1),
(2) Date: Apr. 22, 2022

(87) PCT Pub. No.: WO2021/131744
PCT Pub. Date: Jul. 1, 2021

(65) Prior Publication Data
US 2022/0368191 A1    Nov. 17, 2022

(30) Foreign Application Priority Data
Dec. 26, 2019  (JP) .................. 2019-235738

(51) Int. Cl.
*H02K 5/22*    (2006.01)
(52) U.S. Cl.
CPC ......... *H02K 5/225* (2013.01); *H02K 2203/03* (2013.01)

(58) Field of Classification Search
CPC ........................ H02K 5/225; H02K 2203/03
See application file for complete search history.

(56) References Cited

U.S. PATENT DOCUMENTS 10,181,766 B2    1/2019  Haga et al.
2005/0093379 A1*  5/2005  Tanabe ................. H02K 1/146
                                               310/43
(Continued)

FOREIGN PATENT DOCUMENTS

JP    2008259310 A    10/2008
JP    2010061957 A     3/2010
(Continued)

OTHER PUBLICATIONS

European Search Report in counterpart European application No. 20907442.6 issued on Dec. 9, 2022.
(Continued)

*Primary Examiner* — Jue Zhang
(74) *Attorney, Agent, or Firm* — Renner, Otto, Boisselle & Sklar, LLP (57) ABSTRACT

A stator sub-assembly with a connector includes a stator sub-assembly including a stator core and a rigid wiring board, and a connector fixed to a connector mounting part of the rigid wiring board in such a way that it is opposed to the stator core in the radial direction of the frame. A groove part that extends in the axial direction from an opening in the axial direction and accommodates the connector and the connector mounting part is formed in an inner peripheral surface of the frame. A window part for an opponent connector to mate with the connector accommodated in the groove part is formed in the frame. The window part opens in an outer surface of the frame and an inner surface of the groove part, and has an unbroken inner peripheral surface.

6 Claims, 9 Drawing Sheets

(56) References Cited

U.S. PATENT DOCUMENTS

| | | | |
|---|---|---|---|
| 2013/0078124 | A1 | 3/2013 | Fukasaku et al. |
| 2016/0065031 | A1 | 3/2016 | Yamada et al. |

FOREIGN PATENT DOCUMENTS

| | | | |
|---|---|---|---|
| JP | 2013072338 | A | 4/2013 |
| JP | 5874934 | A | 12/2014 |
| JP | 2016048981 | A | 4/2016 |
| JP | 6187788 | B2 | 8/2017 |
| JP | 3218112 | U | 9/2018 |
| JP | 6561308 | B2 | 8/2019 |
| KR | 10-1180560 | B1 * | 8/2012 |

OTHER PUBLICATIONS

European Office Action in counterpart European Application No. 20907442.6 issued on Jan. 9, 2023.
Taiwan Office Action in counterpart Taiwan Application No. 109145367 issued on Oct. 8, 2021 with Machine Translation.
Japanese Office Action in counterpart Japanese Patent Application No. 2019-235738 issued on Apr. 7, 2020 with Machine Translation.
Japanese Office Action in counterpart Japanese Patent Application No. 2019-235738 issued on Aug. 18, 2020 with Machine Translation.

* cited by examiner

ROTARY ELECTRIC MOTOR

This application is a national phase of International Application No. PCT/JP2020/046034 filed on Dec. 10, 2020, which claims priority to Japanese Patent Application No. 2019-235738 filed on Dec. 26, 2019 with the Japan Patent Office, which are hereby incorporated herein by reference.

TECHNICAL FIELD

The present invention relates to a rotary electric motor.

BACKGROUND ART

Patent Literature 1 (Japanese Patent No. 6561308) assembles a bracket by connecting a wire connection part (board) of a frame body and a connector through a lead wire or the like. However, the distance from the end of the frame body to the wire connection board is long, and workability is low. Since the connector cannot be inserted into the frame body after a receiving part of the connector is attached to a stator, workability is low.

In Patent Literature 2 (Japanese Patent No. 5874934) and Patent Literature 3 (Japanese Patent No. 6187788), a connector is inserted into a frame body after it is attached to a wire connection part. However, since the connector projects in the axial direction with respect to the frame body, the overall length is long, and downsizing is not achieved.

SUMMARY OF INVENTION

Technical Problem

An object of the present invention is to provide a technique for downsizing and a technique that allows an intermediate assembly to be accommodated in a cylindrical frame body even after a connector is attached to the intermediate assembly in such a way that it is opposed to the intermediate assembly in a radial direction of the frame body.

Solution to Problem

According to an aspect of the present invention, there is provided a rotary electric motor including an object to be accommodated; and a stator frame body in a cylindrical shape that accommodates the object to be accommodated, wherein the object to be accommodated includes an intermediate assembly including a stator core and a rigid wiring board disposed to be opposed to the stator core in an axial direction, the rigid wiring board including a ring-shaped wiring board body and a connector mounting part projecting outward in a radial direction from the wiring board body, and a connector to be fixed to the connector mounting part of the rigid wiring board in such a way that the connector is opposed to the stator core in the radial direction of the stator frame body, the connector including a contact to be soldered to the connector mounting part and a housing that holds the contact, a groove part extending in the axial direction from an opening in the axial direction and accommodates the connector and the connector mounting part is formed in an inner peripheral surface of the stator frame body, a window part for an opponent connector to mate with the connector accommodated in the groove part is formed in the stator frame body, and the window part opens in an outer surface of the stator frame body and an inner surface of the groove part, and has an unbroken inner peripheral surface.

It is preferred that the contact of the connector includes a board connection part to be soldered to the connector mounting part of the rigid wiring board, and the intermediate assembly and the board connection part of the contact of the connector are both sealed with resin.

It is preferred that a sealing surface in a planar shape is formed on the outer surface of the stator frame body, and the inner surface of the groove part includes a ceiling surface parallel to the sealing surface.

It is preferred that the stator frame body includes a raised part that is raised outward in the radial direction, and the window part is formed in the raised part.

It is preferred that the contact is in a flat-plate shape.

It is preferred that the housing is provided with a pin for positioning or fixing.

Advantageous Effects of Invention

According to the present invention, a technique for downsizing and a technique that allows an intermediate assembly to be accommodated in a cylindrical frame body even after a connector is attached to the intermediate assembly in such a way that it is opposed to the intermediate assembly in a radial direction of the frame body.

DESCRIPTION OF EMBODIMENTS

First Embodiment

A first embodiment of the present invention is described hereinafter with reference to FIGS. 1 to 14.

Figure 1:
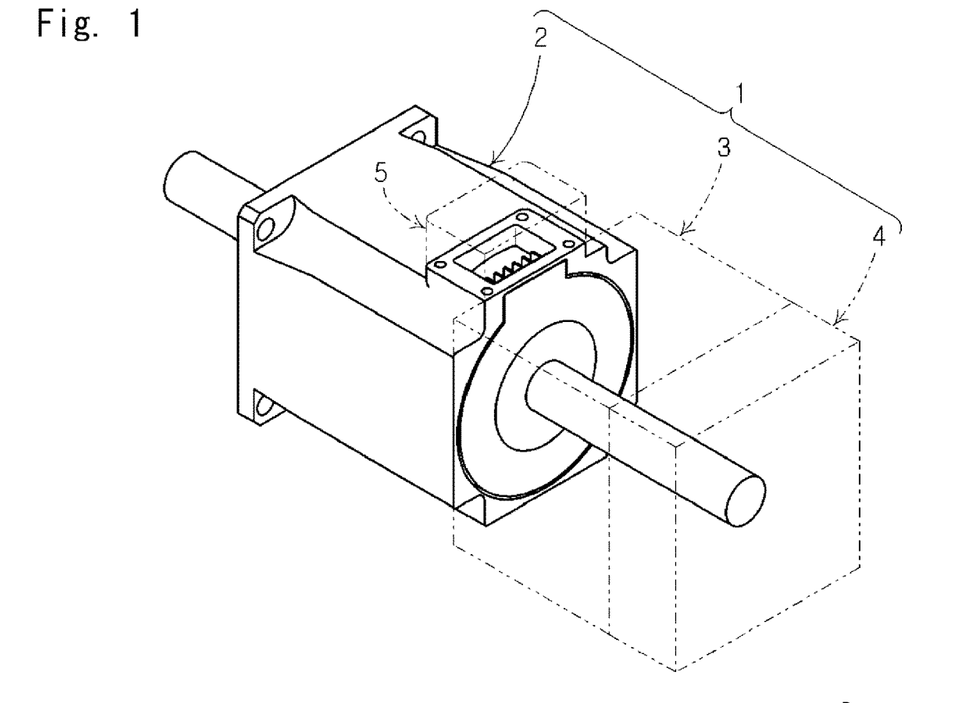
FIG. 1 is a perspective view of a rotary electric motor with a holding brake (first embodiment)

FIG. 1 is a perspective view of a rotary electric motor with a holding brake 1. As shown in FIG. 1, the rotary electric motor with a holding brake 1 includes a rotary electric motor 2, a holding brake 3, and an encoder 4.

The electric motor 2 is a three-phase synchronous motor that is rotary driven by three-phase alternating current supplied through an external connector 5. The electric motor 2 may be a three-phase induction motor, and it may be rotary driven by single-phase alternating current.

Figure 2:
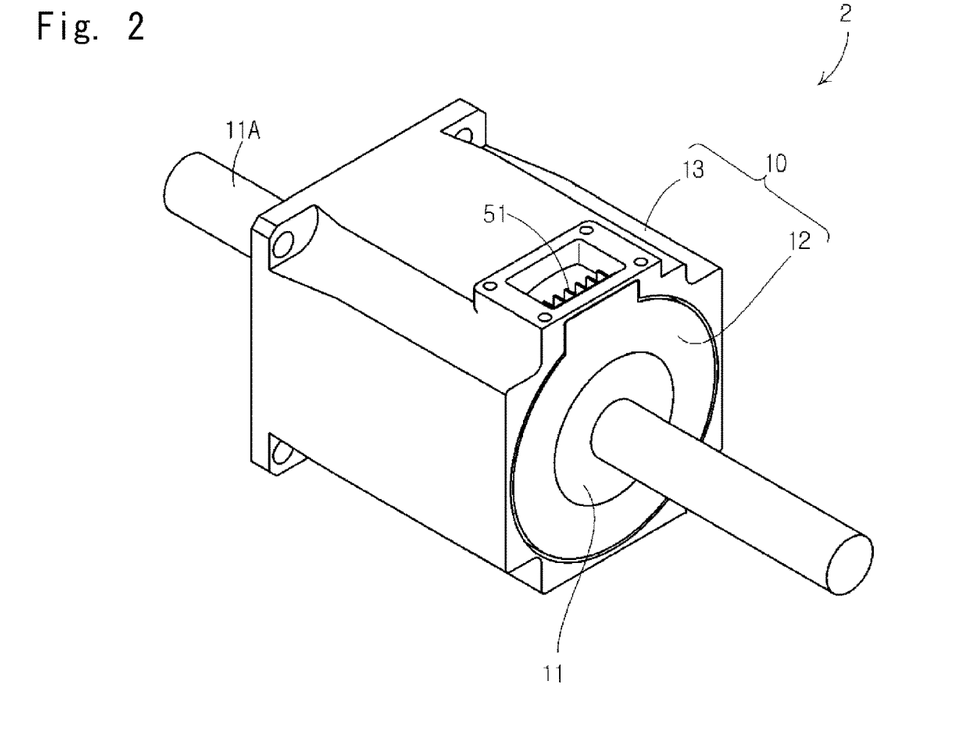
FIG. 2 is a perspective view of a rotary electric motor (first embodiment)

FIG. 2 is a perspective view of the rotary electric motor 2. As shown in FIG. 2, the rotary electric motor 2 includes a stator 10 and a rotor 11. In this specification, the radial direction of the rotary electric motor 2 is referred to simply as a radial direction. Likewise, the axial direction of the rotary electric motor 2 is referred to simply as an axial direction.

Figure 3:
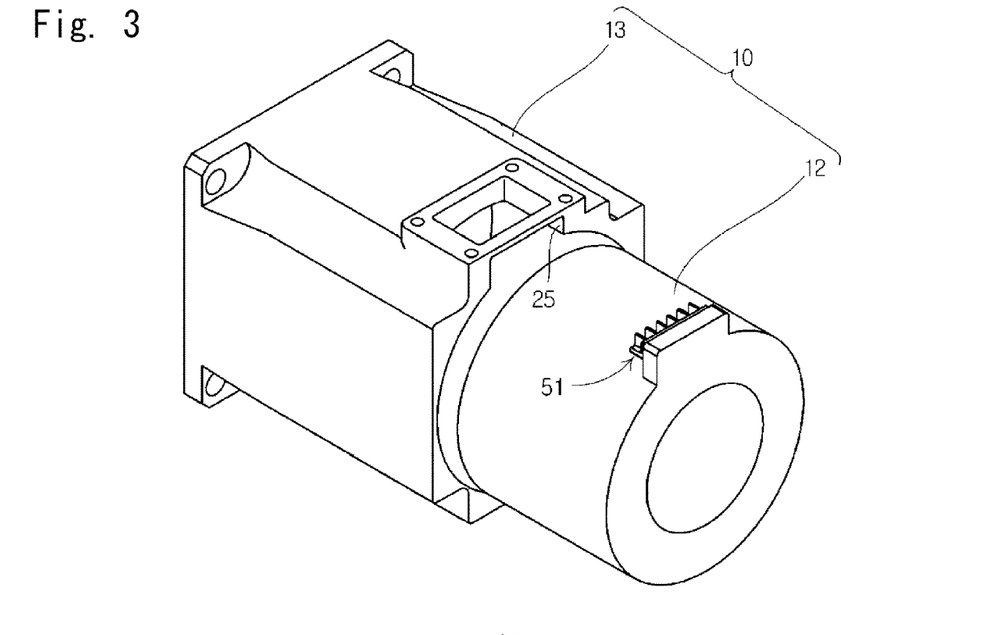
FIG. 3 is an exploded perspective view of a stator (first embodiment)

As shown in FIGS. 2 and 3, the stator 10 includes a stator sub-assembly with a connector 12 (object to be accommodated) and a cylindrical frame 13 (stator frame body) that accommodates the stator sub-assembly with a connector 12.

Figure 4:
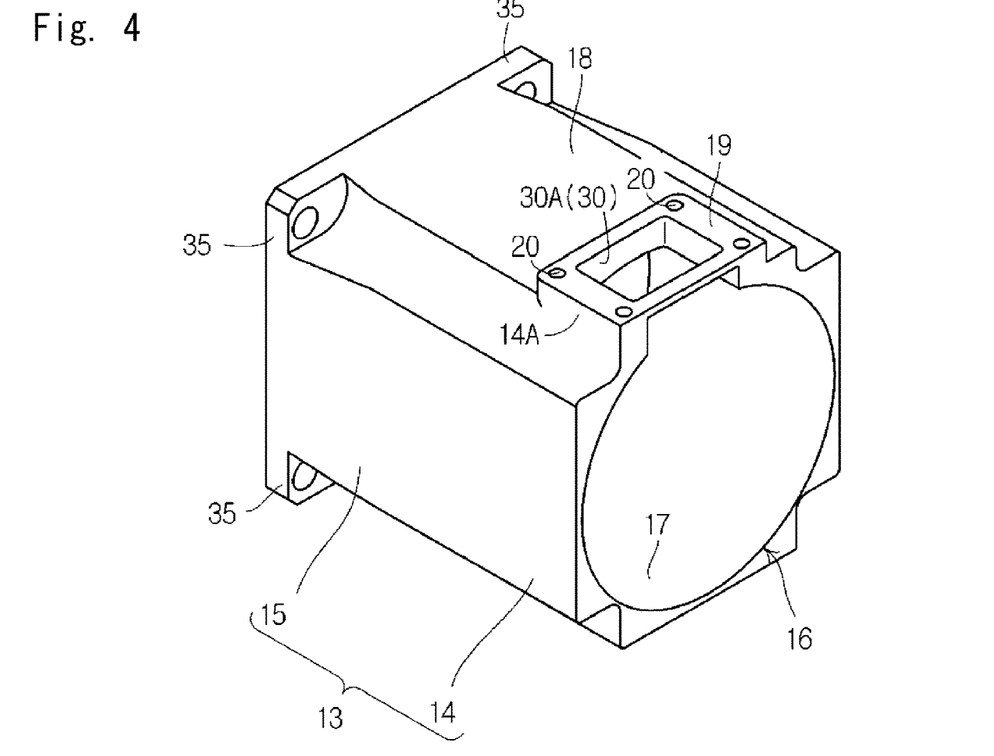
FIG. 4 is a perspective view the a frame (first embodiment)
Figure 5:
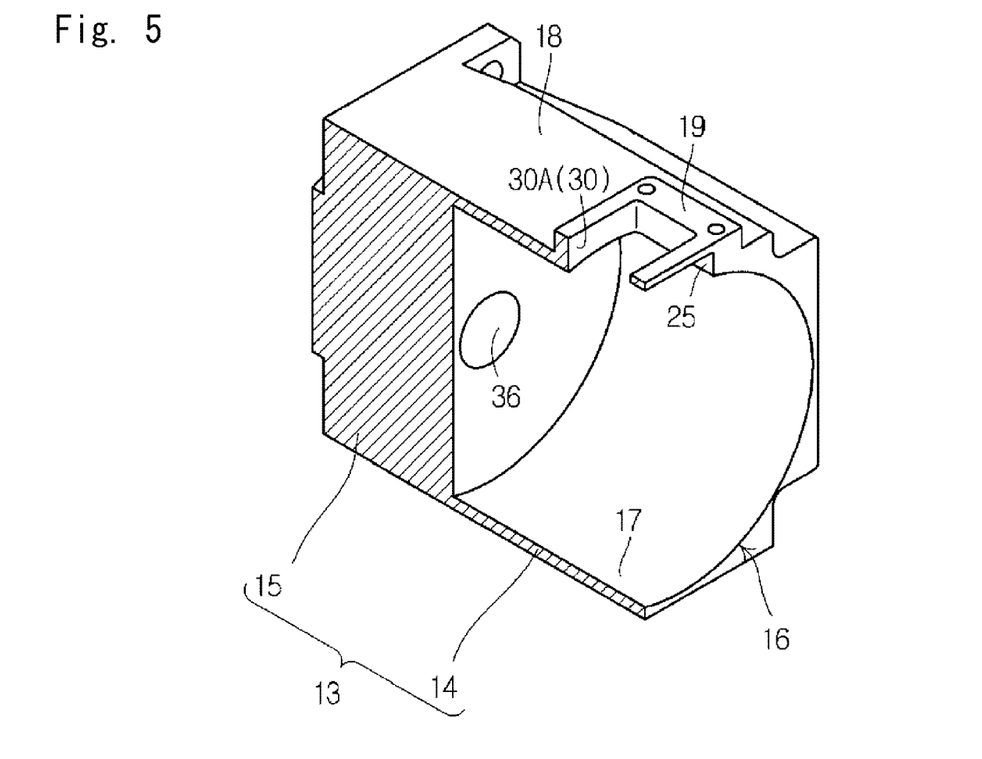
FIG. 5 is a partially cutout perspective view of the frame (first embodiment)
Figure 6:
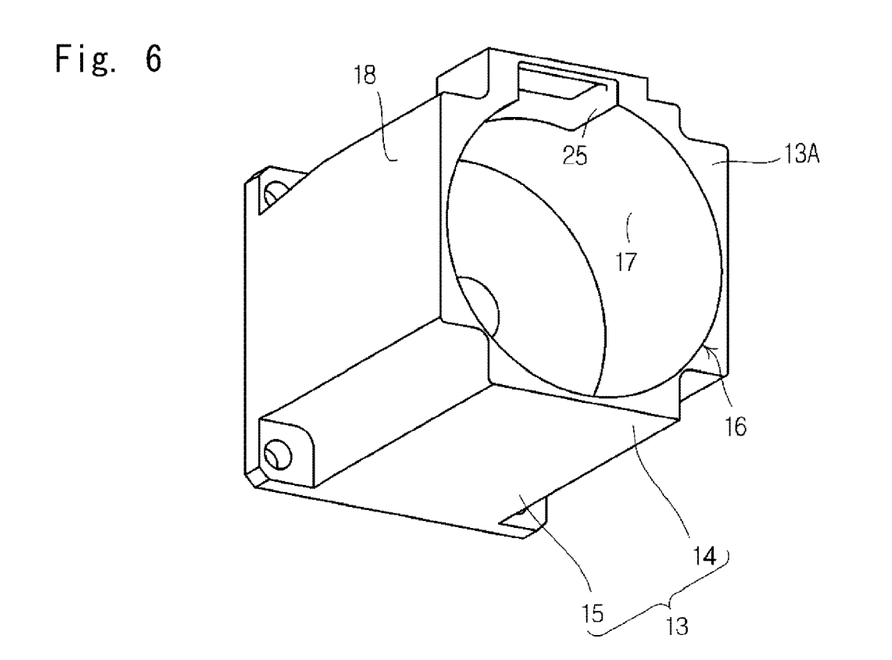
FIG. 6 is a perspective view of the frame viewed from another angle (first embodiment)

FIGS. 4 to 8 show the frame 13. As shown in FIGS. 4 to 6, the frame 13 has a shape of a bottomed cylinder. Specifically, the frame 13 includes a cylindrical peripheral wall 14 and a bottom 15. The frame 13 is made of metal such as aluminum, for example. Alternatively, the frame 13 may be made of resin.

The peripheral wall 14 extends in a cylindrical shape in the axial direction. The peripheral wall 14 has an opening 16 that opens in the direction away from the bottom 15 in the axial direction. The peripheral wall 14 has the opening 16 in the axial direction. The peripheral wall 14 includes an inner peripheral surface 17 with a circular cross section and an outer peripheral surface 18 (outer surface) with a rectangular cross section.

Figure 7:
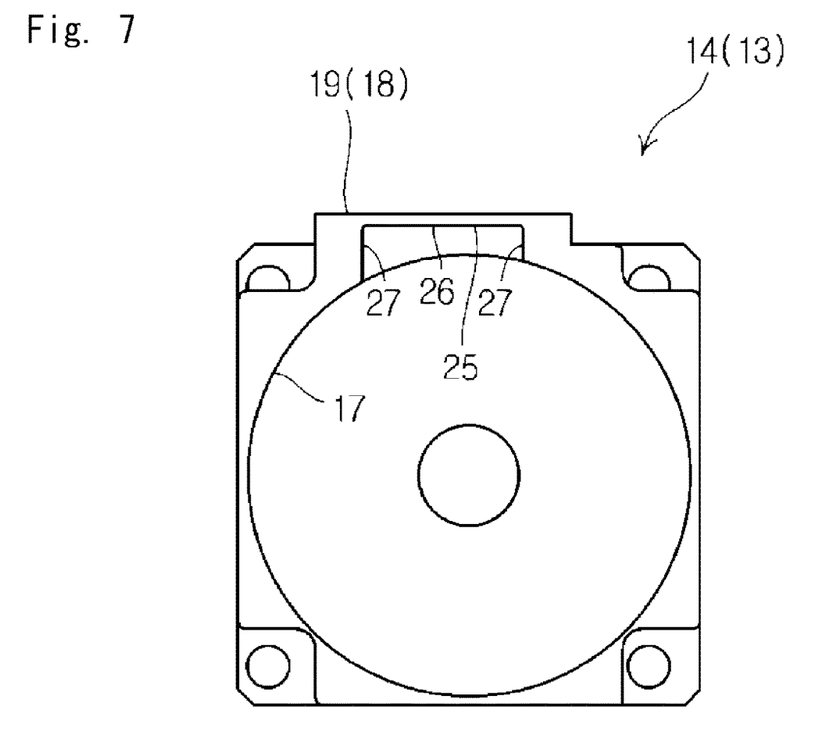
FIG. 7 is a right side view of the frame (first embodiment)
Figure 8:
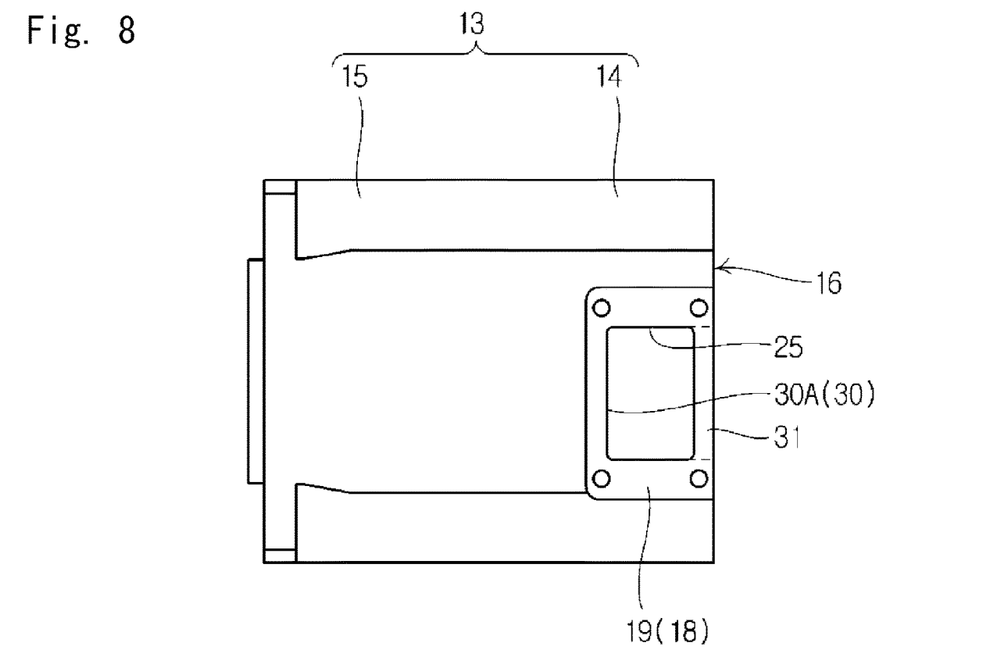
FIG. 8 is a plan view of the frame (first embodiment)

As shown in FIGS. 4, 7 and 8, a planar sealing surface 19 is formed on the outer peripheral surface 18. The sealing surface 19 is formed in an unbroken ring shape. As shown in FIG. 4, a plurality of female screws 20 for attaching the external connector 5 to the frame 13 are formed on the sealing surface 19.

As shown in FIGS. 6 and 7, the inner peripheral surface 17 of the peripheral wall 14 has a groove part 25. As shown in FIG. 7, the groove part 25 is formed to be recessed from the inner peripheral surface 17 toward the sealing surface 19. As shown in FIGS. 6 and 8, the groove part 25 is formed to extend in the axial direction from the opening 16 toward the bottom 15 of the frame 13. The groove part 25 is formed to extend in the axial direction from an axial direction end face 13A toward the bottom 15 of the frame 13. The groove part 25 extends from the opening 16 of the frame 13 to reach the center of the peripheral wall 14 in the axial direction. As shown in FIG. 7, the groove part 25 includes a ceiling surface 26 that is an inner surface parallel to the sealing surface 19 and two inner side surfaces 27 that are inner surfaces orthogonal to the ceiling surface 26. Thus, the groove part 25 is partitioned by the ceiling surface 26 and the two inner side surfaces 27. The ceiling surface 26 is away from the inner peripheral surface 17 in the radial direction. Specifically, the ceiling surface 26 is located more outward in the radial direction than the inner peripheral surface 17 that looks circular when viewed from the side in FIG. 7. The groove part 25 opens to the inner peripheral surface 17. The groove part 25 opens inward in the radial direction. As shown in FIG. 6, the groove part 25 opens to the axial direction end face 13A of the frame 13.

As shown in FIGS. 4, 5, and 8, a window part 30 is formed in the peripheral wall 14 of the frame 13. The window part 30 is formed in a rectangle when viewed from the above. The window part 30 opens to the sealing surface 19 and the ceiling surface 26 of the groove part 25 shown in FIG. 7. The window part 30 is a penetrating hole that penetrates the peripheral wall 14 in the radial direction. The window part 30 is a penetrating hole that penetrates the peripheral wall 14 in the direction orthogonal to the axial direction. As shown in FIG. 4, the window part 30 is formed away from the opening 16 in the axial direction. Thus, as shown in FIG. 8, the sealing surface 19 surrounds the window part 30 in an unbroken manner when viewed from the above. Further, in the plan view of FIG. 8, the peripheral wall 14 can be regarded as having a beam part 31 between the window part 30 and the opening 16. The unbroken ring-shaped sealing surface 19 is achieved by the presence of the beam part 31. The window part 30 has an unbroken inner peripheral surface 30A.

As shown in FIG. 4, the bottom 15 has a plurality of, e.g., four, flanges 35 for attaching a load side of the rotary electric motor with a holding brake 1 to a support frame, which is not shown. Further, as shown in FIG. 5, the bottom 15 has a penetrating hole 36 for an output axis 11A of the rotor 11 shown in FIG. 2 to penetrate. The output axis 11A of the rotor 11 is supported by a bearing, which is not shown, though description and illustration of the bearing are omitted.

The stator sub-assembly with a connector 12 is described hereinafter with reference to FIGS. 9 to 12.

Figure 9:
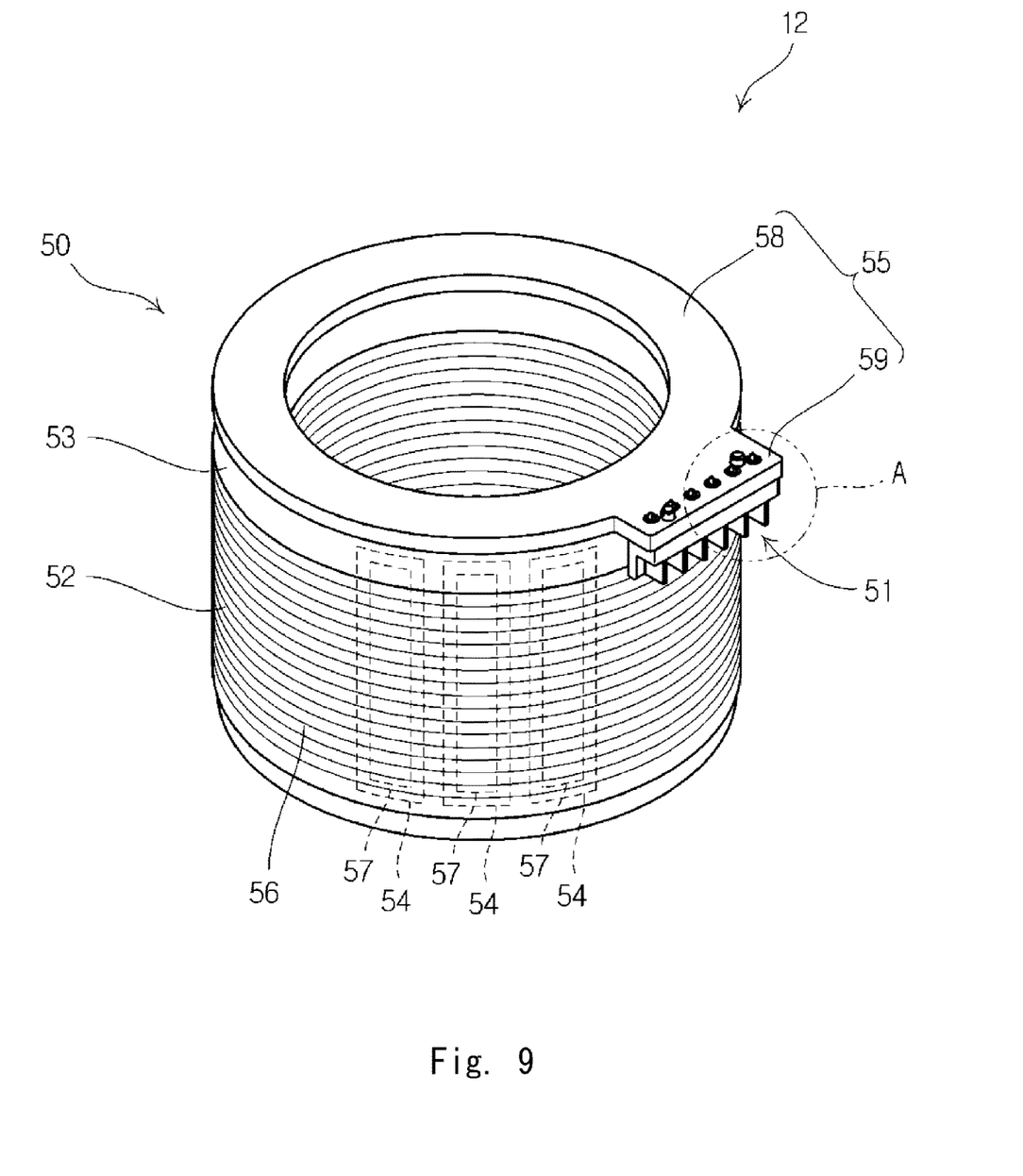
FIG. 9 is a perspective view of a stator sub-assembly with a connector before being sealed with resin (first embodiment)
Figure 12:
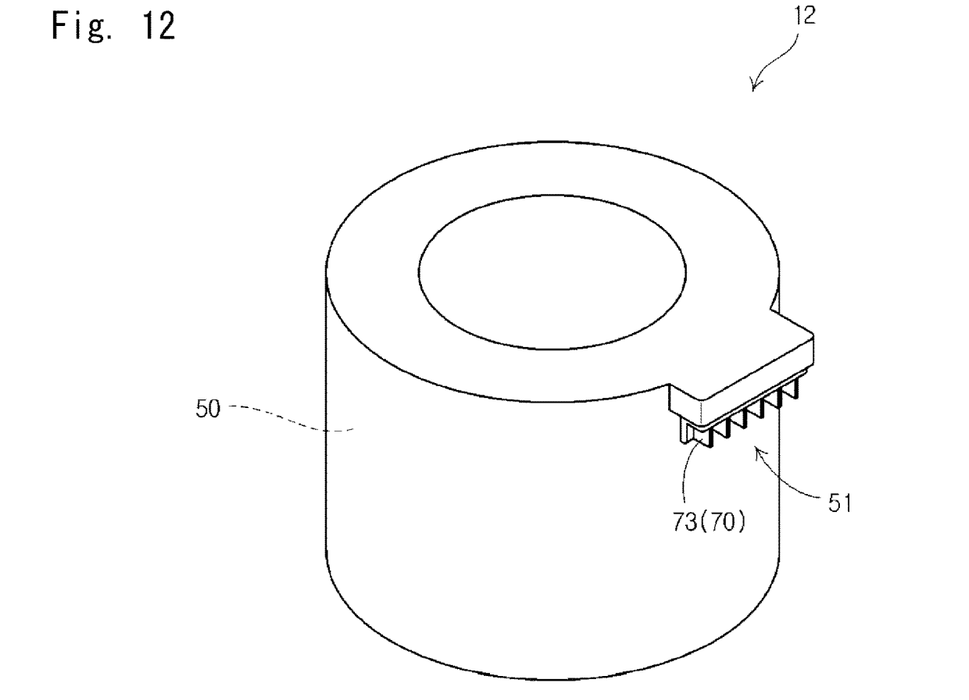
FIG. 12 is a perspective view of the stator sub-assembly with a connector after being sealed with resin (first embodiment)

FIG. 9 shows the stator sub-assembly with a connector 12 before being sealed with resin. FIG. 12 shows the stator sub-assembly with a connector 12 after being sealed with resin.

As shown in FIG. 9, the stator sub-assembly with a connector 12 includes a stator sub-assembly 50 (intermediate assembly) and a connector 51. The connector 51 is attached to the stator sub-assembly 50 in such a way that it is opposed to the stator sub-assembly 50 in the radial direction. Specifically, the connector 51 is fixed to the stator sub-assembly 50 in such a way that it is opposed to the stator sub-assembly 50 in the radial direction. The connector 51 is disposed on the outer periphery of the stator sub-assembly 50. The connector 51 is disposed outward in the radial direction of the stator sub-assembly 50.

The stator sub-assembly 50 includes a stator core 52, an insulator 53, a plurality of coils 54, and a wiring board 55.

The stator core 52 is a laminate of electromagnetic steel sheets. The stator core 52 includes a ring-shaped core body 56 and a plurality of tooth parts 57 projecting inward in the radial direction from the core body 56.

The insulator 53 is disposed to cover the plurality of tooth parts 57.

The plurality of coils 54 are disposed respectively on the plurality of tooth parts 57 with the insulator 53 interposed therebetween.

Figure 10:
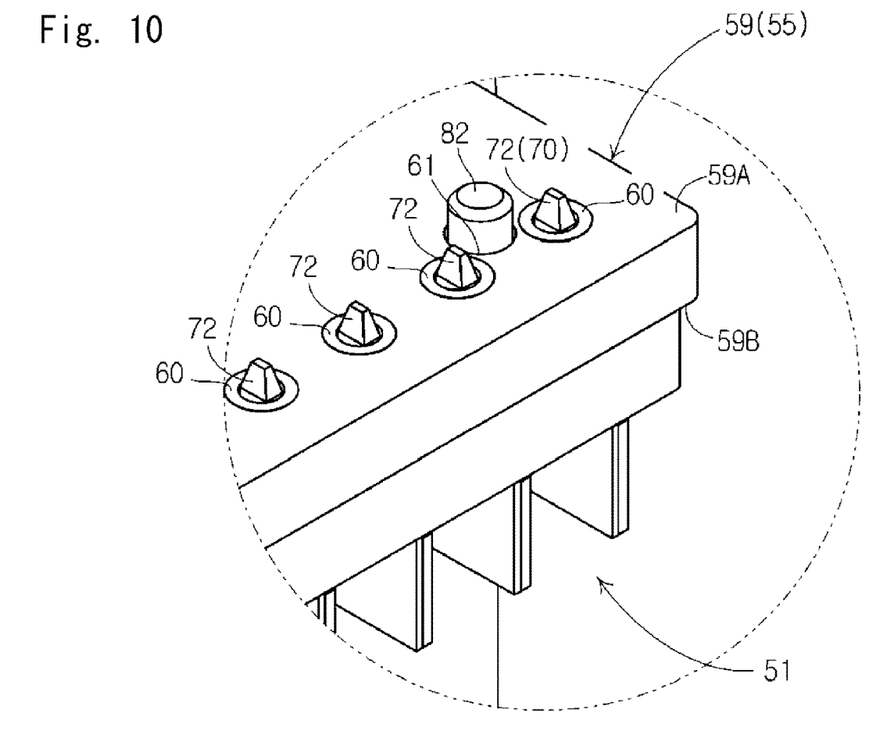
FIG. 10 is an enlarged view of a part A in FIG. 9 (first embodiment)

The wiring board 55 is a rigid wiring board, and it is disposed to be opposed to the stator core 52 in the axial direction. The thickness direction of the wiring board 55 is parallel to the axial direction. The wiring board 55 includes a ring-shaped wiring board body 58 and a connector mounting part 59 that projects outward in the radial direction from the wiring board body 58. A circuit pattern is formed on the wiring board body 58, and coil winding of each coil 54 is electrically connected to this circuit pattern. As shown in FIGS. 9 and 10, the connector mounting part 59 includes an upper surface 59A and a lower surface 59B facing the axial direction. The upper surface 59A is a surface on the opposite side of the lower surface 59B. The upper surface 59A faces the direction of getting away from the stator core 52. The lower surface 59B faces the direction of getting closer to the stator core 52. A plurality of electrode lands 60 are formed on the upper surface 59A of the connector mounting part 59. The connector mounting part 59 has a plurality of positioning holes 61. In this embodiment, six electrode lands 60 and two positioning holes 61 are formed on the connector mounting part 59 as an example.

Figure 11:
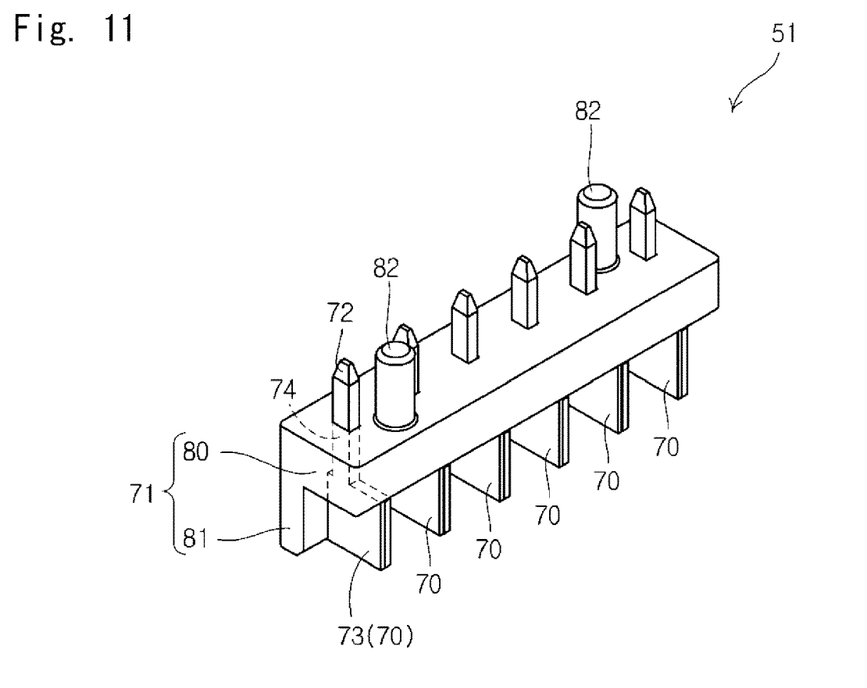
FIG. 11 is a perspective view of a connector (first embodiment)

As shown in FIG. 10, the connector 51 is fixed to the connector mounting part 59 of the wiring board 55. As shown in FIG. 11, the connector 51 includes a plurality of contacts 70 and a housing 71 made of insulating resin that aligns and holds the plurality of contacts 70.

Each contact 70 is formed in a flat-plate shape. Each contact 70 includes a board connection part 72 to be soldered to each electrode land 60 disposed on the upper surface 59A of the connector mounting part 59 of the wiring board 55 shown in FIG. 10, a contact part 73 that comes into contact with a contact (opponent contact) of the external connector 5, and a holding part 74 that is embedded and held in the housing 71.

Each board connection part 72 has a pin shape and extends in the axial direction.

Each contact part 73 is formed in a flat-plate shape. The contact parts 73 of the plurality of contacts 70 are arranged in the direction orthogonal to the axial direction. The thickness direction of the plurality of contact parts 73 is the same as the direction the plurality of contact parts 73 are arranged along.

Note that, in this embodiment, the connector 51 includes six contacts 70 as an example. Three contacts 70 of them are connected to the plurality of coils 54 of the rotary electric motor 2. Another one contact 70 is connected to a neutral point of the rotary electric motor 2. The remaining two contacts 70 may be connected to the holding brake 3 or connected to the encoder 4, for example.

The housing 71 includes an embedment part 80 in which the holding parts 74 of the plurality of contacts 70 are embedded, a receiving part 81 to receive the contact parts 73 of the plurality of contacts 70, and two positioning pins 82 (pins). The embedment part 80 and the receiving part 81 form an L shape when viewed along the direction the plurality of contacts 70 are arranged along. The two positioning pins 82 project in the axial direction from the embedment part 80. Note that the housing 71 may have only one positioning pin 82 or may have three or more positioning pins 82. The positioning pins 82 may be used to fix the connector 51 to the wiring board 55.

Then, as shown in FIG. 10, the connector 51 is mounted on the lower surface 59B of the connector mounting part 59 of the wiring board 55. To be specific, each positioning pin 82 of the housing 71 of the connector 51 is inserted into each positioning hole 61 of the connector mounting part 59 of the wiring board 55, and also the board connection part 72 of each contact 70 of the connector 51 is soldered to each electrode land 60 of the connector mounting part 59 of the wiring board 55. The housing 71 of the connector 51 is opposed to the lower surface 59B of the connector mounting part 59 of the wiring board 55 in the axial direction. Note that FIG. 10 shows the state before each board connection part 72 is soldered to each electrode land 60 for the purpose of illustration.

Then, as shown in FIG. 12, the stator sub-assembly 50 is sealed with resin. The stator sub-assembly with a connector 12 is thereby completed. Note that the board connection part 72 of each contact 70 of the connector 51 is also sealed with resin at the same time when the stator sub-assembly 50 is sealed with resin. On the other hand, the contact part 73 of each contact 70 of the connector 51 is left uncovered without being sealed with resin.

Figure 13:
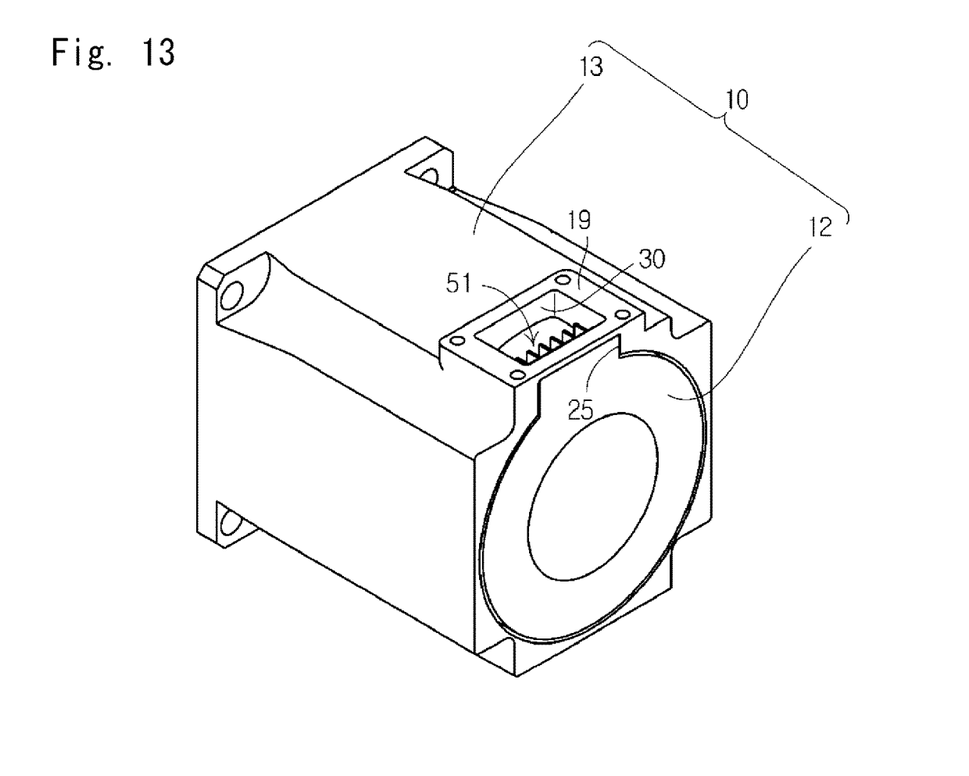
FIG. 13 is a perspective view of a stator (first embodiment)

FIG. 3 shows the state just before the stator sub-assembly with a connector 12 is inserted into the frame 13. FIG. 13 shows the state after the stator sub-assembly with a connector 12 is inserted into the frame 13, and the frame 13 accommodates the stator sub-assembly with a connector 12.

As shown in FIGS. 3 and 13, the stator sub-assembly with a connector 12 is inserted into the frame 13. At this time, the connector 51 of the stator sub-assembly with a connector 12 is inserted into the groove part 25 of the frame 13, moves inside the groove part 25 in the axial direction along the groove part 25, and is thereby accommodated together with the connector mounting part 59 of the connector 51 into the groove part 25. When inserting the stator sub-assembly with a connector 12 into the frame 13, the stator sub-assembly with a connector 12 may be shrink-fitted to the frame 13 by preheating and expanding the frame 13 in the radial direction. Alternatively, the stator sub-assembly with a connector 12 may be clearance-fitted to the frame 13, and the clearance may be filled with an adhesive or the like.

Figure 14:
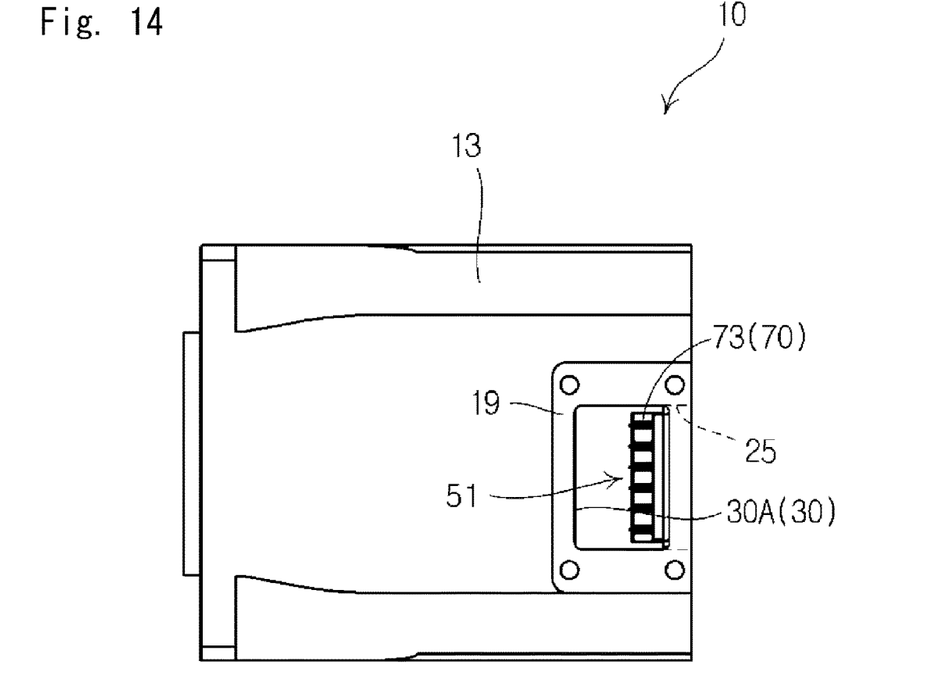
FIG. 14 is a plan view of the stator (first embodiment)

FIG. 14 is a plan view of the stator 10 after the stator sub-assembly with a connector 12 is inserted into the frame 13. In the plan view of FIG. 14, in the state where the stator sub-assembly with a connector 12 is inserted into the frame 13, the contact part 73 of each contact 70 that constitutes the connector 51 is visible through the window part 30. Specifically, the contact part 73 of each contact 70 is located inside the unbroken inner peripheral surface 30A of the window part 30 in the plan view of FIG. 14. As shown in FIG. 13, the connector 51 is located more inward in the radial direction than the sealing surface 19. The connector 51 that is accommodated in the groove part 25 is accessible from the outside through the window part 30. Thus, the external connector 5 can be mated with the connector 51 through the window part 30.

Note that, however, as long as the connector 51 accommodated in the groove part 25 is accessible from the outside through the window part 30, the contact part 73 of each contact 70 that constitutes the connector 51 may be invisible through the window part 30 in the state where the stator sub-assembly with a connector 12 is inserted into the frame 13.

A manufacturing method of the stator 10 of the rotary electric motor 2 is described hereinafter.

S1: Attachment Step

First, as shown in FIG. 10, the connector 51 is attached to the lower surface 59B of the connector mounting part 59 of the wiring board 55 of the stator sub-assembly 50.

S2: Sealing Step

Next, as shown in FIG. 12, the stator sub-assembly 50 is sealed with resin. Note that this sealing step may be omitted.

S3: Accommodation Step

Then, as shown in FIGS. 3 and 13, the stator sub-assembly with a connector 12 is inserted into the frame 13 and accommodated therein.

In this embodiment, the radial direction of the rotary electric motor 2 and the radial direction of the frame 13 are the same, and the axial direction of the rotary electric motor 2 and the axial direction of the frame 13 are the same.

A preferred embodiment of the present disclosure is described above, and the above-described embodiment has the following features.

As shown in FIGS. 1 to 14, the rotary electric motor 2 includes the stator sub-assembly with a connector 12 (object to be accommodated) and the cylindrical frame 13 (stator frame body) that accommodates the stator sub-assembly with a connector 12. The stator sub-assembly with a connector 12 includes the stator sub-assembly 50 (intermediate assembly) and the connector 51 that is attached to the stator sub-assembly 50 in such a way that it is opposed to the stator sub-assembly 50 in the radial direction (the radial direction of the frame 13). The groove part 25 that extends in the axial direction from the opening 16 of the frame 13 in the axial direction and accommodates the connector 51 is formed in the inner peripheral surface 17 of the frame 13. In the frame 13, the window part 30 is formed for the external connector 5 (opponent connector) to mate with the connector 51 accommodated in the groove part 25. The window part 30 opens in the sealing surface 19 (outer surface) of the outer peripheral surface 18 of the frame 13 and the ceiling surface 26 (inner surface) of the groove part 25, and it has the unbroken inner peripheral surface 30A. This structure implements a technique for downsizing of the rotary electric motor 2. This structure also implements a technique that allows the stator sub-assembly 50 to be accommodated in the frame 13 even after the connector 51 is attached to the stator sub-assembly 50 in such a way that it is opposed to the stator sub-assembly 50 in the radial direction of the cylindrical frame 13.

Specifically, in the case where the connector 51 is attached to the stator sub-assembly 50 after the stator sub-assembly 50 is inserted into the frame 13, automatization of the attachment step is difficult to achieve due to unavailability of an attachment work space. On the other hand, in this embodiment, the connector 51 is attached to the stator sub-assembly 50 before the stator sub-assembly 50 is inserted into the frame 13, so that automatization of the attachment step is achieved.

The rotary electric motor 2 includes the stator sub-assembly with a connector 12 (object to be accommodated) and the cylindrical frame 13 (stator frame body) that accommodates the stator sub-assembly with a connector 12. The stator sub-assembly with a connector 12 includes the stator sub-assembly 50 (intermediate assembly) and the connector 51. The stator sub-assembly 50 includes the stator core 52 and the wiring board 55 (rigid wiring board). The wiring board 55 is disposed to be opposed to the stator core 52 in the axial direction. The wiring board 55 includes the ring-shaped wiring board body 58 and the connector mounting part 59 that projects outward in the radial direction from the wiring board body 58. The connector 51 is fixed to the connector mounting part 59 of the wiring board 55 in such a way that it is opposed to the stator core 52 in the radial direction of the frame 13. The connector 51 includes the contact 70 to be soldered to the connector mounting part 59 and the housing 71 that holds the contact 70. The groove part 25 that extends in the axial direction from the opening 16 of the frame 13 in the axial direction and accommodates the connector 51 and the connector mounting part 59 is formed in the inner peripheral surface 17 of the frame 13. In the frame 13, the window part 30 is formed for the external connector 5 (opponent connector) to mate with the connector 51 accommodated in the groove part 25. The window part 30 opens in the sealing surface 19 (outer surface) of the outer peripheral surface 18 of the frame 13 and the ceiling surface 26 (inner surface) of the groove part 25, and it has the unbroken inner peripheral surface 30A.

In this structure, first, the connector 51 is disposed to be opposed to the stator core 52 in the radial direction, which achieves downsizing of the rotary electric motor 2 in the axial direction compared with the case where the connector 51 is disposed at a position not opposed to the stator core 52 in the radial direction. Second, this structure allows the stator core 52 to be accommodated in the frame 13 even after the connector 51 is attached to the wiring board 55 in such a way that the connector 51 is opposed to the stator core 52 in the radial direction while the inner peripheral surface 30A of the window part 30 kept unbroken to ensure the sealing ability. Particularly, the above second technical effect allows the connector 51 to be attached to the wiring board 55 before the stator core 52 is accommodated into the frame 13, which makes manufacturing easier and can reduce the manufacturing cost. In this way, this structure achieves downsizing, reliable sealing, and manufacturing cost reduction at the same time.

Further, as shown in FIG. 9, the connector 51 is supported by the wiring board 55. Alternatively, the connector 51 may be supported by the stator core 52 or the insulator 53.

Further, as shown in FIG. 9, the connector 51 is soldered to the wiring board 55. Alternatively, the connector 51 may be attached to the wiring board 55 by an adhesive.

Further, as shown in FIG. 11, the connector 51 includes the plurality of contacts 70 and the housing 71 that aligns and holds the plurality of contacts 70. Each contact 70 includes the contact part 73 that comes into contact with the opponent contact of the external connector 5. Each contact part 73 is formed in a flat-plate shape. This structure contributes to reducing the height of the connector 51 while allowing each contact part 73 to have a sufficient surface area compared with the case where each contact part 73 has a pin shape. In other words, this structure contributes to reducing the height of the connector 51 while allowing each contact part 73 to have a sufficient contact area with the opponent contact compared with the case where each contact part 73 has a pin shape. Further, as the height of the connector 51 is reduced, the size of the rotary electric motor 2 in the radial direction is reduced accordingly.

Further, as shown in FIG. 14, the sealing surface 19 of the outer peripheral surface 18 of the frame 13 surrounds the window part 30 with an unbroken plane. Specifically, the sealing surface 19 is an unbroken ring-shaped plane. This structure achieves a high level of sealing performance of the sealing surface 19 that serves as a mating surface between the external connector 5 and the frame 13 when the external connector 5 is attached to the sealing surface 19 of the frame 13, and thereby achieves high air leakage efficiency of the window part 30.

Further, as shown in FIG. 12, the stator sub-assembly 50 is sealed with resin. Alternatively, the stator sub-assembly 50 may be not sealed with resin.

A manufacturing method of the stator 10 of the rotary electric motor 2 includes the attachment step (S1) and the accommodation step (S3) in this recited order. In the attachment step (S1), the connector 51 is attached to the stator sub-assembly 50. In the accommodation step (S3), the stator sub-assembly 50 is accommodated into the cylindrical frame 13. Then, in the accommodation step (S3), the connector 51 is moved along the groove part 25. In this method, a manufacturing method that accommodates the stator sub-assembly 50 into the cylindrical frame 13 after attaching the connector 51 to the stator sub-assembly 50 is achieved.

In addition, the sealing step (S2) that seals the stator sub-assembly 50 with resin is further included after the attachment step (S1) and before the accommodation step (S3). This method allows the stator sub-assembly 50 to be sealed with resin using low-cost facilities.

The above-described embodiment can be modified as follows, for example.

In the above-described embodiment, as shown in FIG. 9, the connector 51 is not opposed to the stator core 52 in the radial direction. However, the entire connector 51 may be opposed to the stator core 52 in the radial direction, or at least part of the connector 51 may be opposed to the stator core 52 in the radial direction.

In the above-described embodiment, as shown in FIG. 9, the entire connector 51 is located more outward in the radial direction than the stator core 52. Alternatively, however, at least part of the connector 51 may be located more outward in the radial direction than the stator core 52, and the remaining part may be opposed to the stator core 52 in the axial direction.

Further, the sealing surface 19 may be further provided with a sealing member or a sealing mechanism for sealing the mating surface when the opponent connector is attached to the sealing surface 19.

Further, as shown in FIG. 4, the sealing surface 19 that surrounds the window part 30 is located more outward in the radial direction than the outer peripheral surface 18 of the peripheral wall 14. Specifically, the peripheral wall 14 is formed to project outward in the radial direction in the vicinity of the window part 30. The peripheral wall 14 of the frame 13 includes a raised part 14A that is raised outward in the radial direction. The window part 30 is formed in the raised part 14A in such a way that it penetrates the raised part 14A in the radial direction. In this structure, the groove part 25 is disposed outward in the radial direction compared with the case where the peripheral wall 14 does not project outward in the radial direction in the vicinity of the window part 30, and therefore the connector 51 is also disposed outward in the radial direction, which allows the diameter of the stator sub-assembly 50 to be large. The sealing surface 19 that surrounds the window part 30 is formed in the raised part 14A.

Further, as shown in FIGS. 1 and 2, the connector 51 may be disposed near the holding brake 3 or may be disposed near the output axis 11A.

Second Embodiment

A second embodiment is described hereinafter with reference to FIG. 15. Differences of this embodiment from the above-described first embodiment are mainly described below, and the redundant description will be omitted.

In the above-described first embodiment, as shown in FIG. 4, the sealing surface 19 that surrounds the window part 30 is located more outward in the radial direction than the outer peripheral surface 18 of the peripheral wall 14. Specifically, the peripheral wall 14 is formed to project outward in the radial direction in the vicinity of the window part 30. The peripheral wall 14 of the frame 13 includes the raised part 14A that is raised outward in the radial direction. The window part 30 is formed in the raised part 14A in such a way that it penetrates the raised part 14A in the radial direction.

Figure 15:
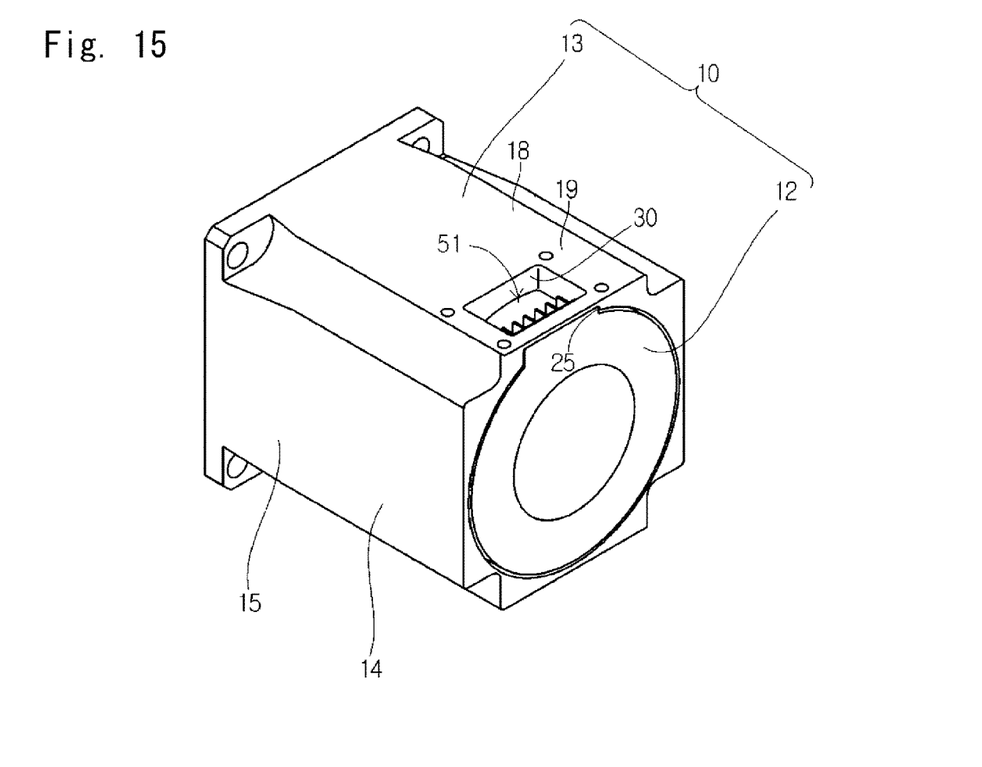
FIG. 15 is a perspective view of a stator (second embodiment)

On the other hand, in this embodiment, as shown in FIG. 15, the sealing surface 19 that surrounds the window part 30 is located in the same plane as the outer peripheral surface 18 of the peripheral wall 14. In other words, the sealing surface 19 that surrounds the window part 30 is flush with the outer peripheral surface 18 of the peripheral wall 14. The raised part 14A is omitted. This structure reduces the size of the frame 13 in the radial direction.

Third Embodiment

A third embodiment is described hereinafter with reference to FIG. 16. Differences of this embodiment from the above-described first embodiment are mainly described below, and the redundant description will be omitted.

Figure 16:
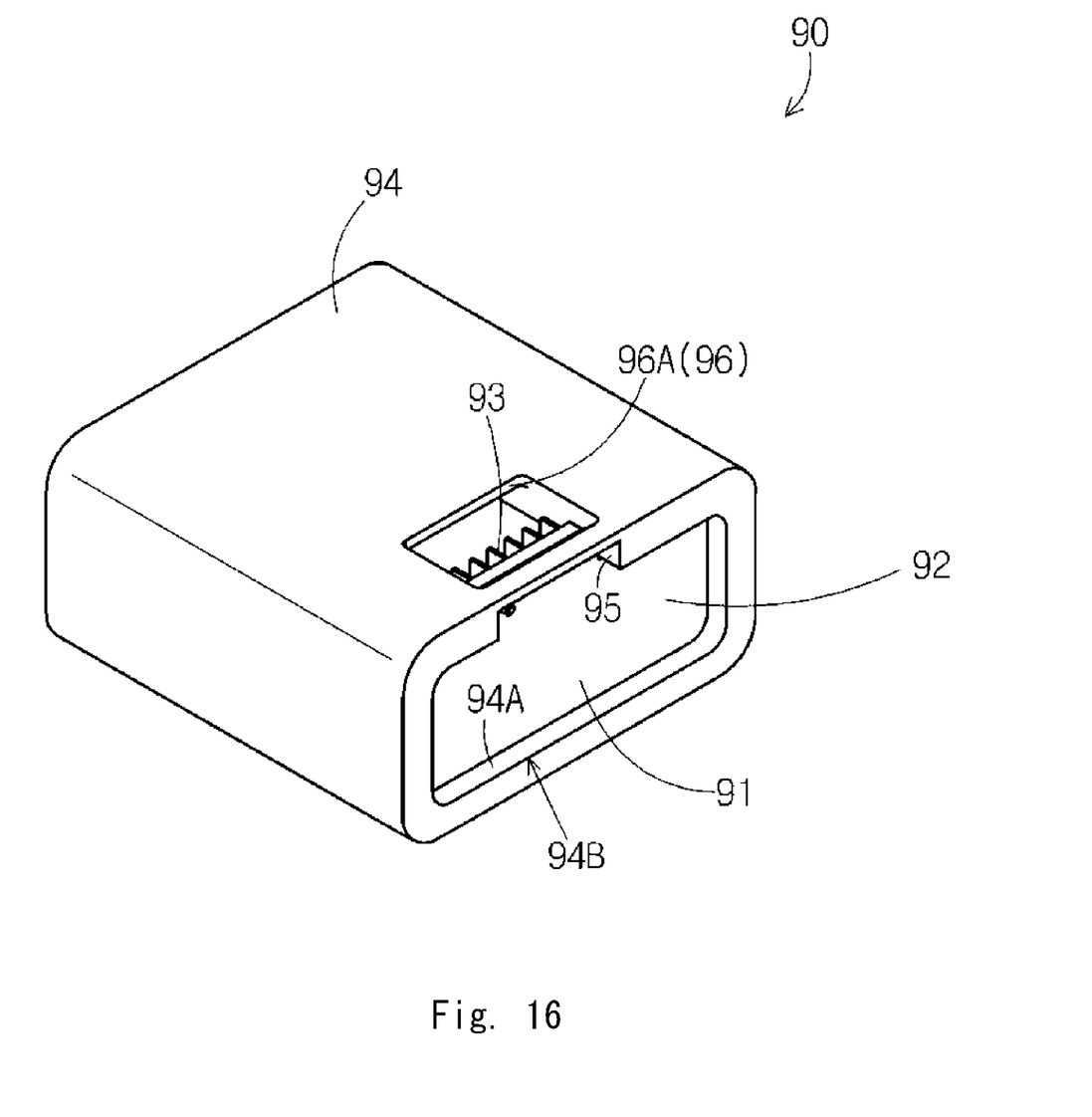
FIG. 16 is a perspective view of general electrical equipment (third embodiment).

FIG. 16 shows general electrical equipment 90. The general electrical equipment 90 includes equipment 91 (object to be accommodated) and a cylindrical accommodation frame body 94 that accommodates the equipment 91.

The equipment 91 includes an intermediate assembly 92, and a connector 93 that is attached to the intermediate assembly 92 in such a way that it is opposed to the intermediate assembly 92 in the radial direction of the accommodation frame body 94.

The inner peripheral surface 94A of the accommodation frame body 94 includes a groove part 95 that extends in the axial direction from an opening 94B of the accommodation frame body 94 in the axial direction and accommodates the connector 93.

In the accommodation frame body 94, a window part 96 is formed for the opponent connector to mate with the connector 93 accommodated in the groove part 95.

The window part 96 opens in an outer surface of the accommodation frame body 94 and an inner surface of the groove part 25, and it has an unbroken inner peripheral surface 96A.

The intermediate assembly 92 may include a mechanism component, a printed board, and a moving component, for example. An electronic component or the like may be mounted on the printed board.

This structure implements a technique for downsizing of the general electrical equipment 90. This structure also implements a technique that allows the intermediate assembly 92 to be accommodated in the accommodation frame body 94 even after the connector 93 is attached to the intermediate assembly 92 in such a way that it is opposed to the intermediate assembly 92 in the radial direction of the cylindrical accommodation frame body 94.

The first to third embodiments are described above, and each of the above embodiments may be combined as appropriate without departing from the technical idea of the present invention This application is based upon and claims the benefit of priority from Japanese patent application No. 2019-235738 filed on Dec. 26, 2019, the disclosure of which is incorporated herein in its entirety by reference.

REFERENCE SIGNS LIST

1 Rotary Electric Motor with Holding Brake
2 Rotary Electric Motor
3 Holding Brake
4 Encoder
5 External Connector (Opponent Connector)
10 Stator
11 Rotor
11A Output Axis
12 Stator Sub-Assembly with Connector (Object to be Accommodated)
13 Frame (Stator Frame Body)
13A Axial Direction End Face
14 Peripheral Wall
14A Raised Part
15 Bottom
16 Opening
17 Inner Peripheral Surface
18 Outer Peripheral Surface
19 Sealing Surface (Outer Surface)
20 Female Screw
25 Groove Part 26 Ceiling Surface (Inner Surface)
27 Inner Side Surface
30 Window Part
30A Inner Peripheral Surface
31 Beam Part
35 Flange
36 Penetrating Hole
50 Stator Sub-Assembly (Intermediate Assembly)
51 Connector
52 Stator Core
53 Insulator
54 Coil
55 Wiring Board
56 Core Body
57 Tooth Part
58 Wiring Board Body
59 Connector Mounting Part
59A Upper Surface
59B Lower Surface
60 Electrode Land
61 Positioning Hole
70 Contact
71 Housing
72 Board Connection Part
73 Contact Part
74 Holding Part
80 Embedment Part
81 Receiving Part
82 Positioning Pin
90 General Electric Equipment
91 Equipment
92 Intermediate Assembly
93 Connector
94 Accommodation Frame Body
94A Inner Peripheral Surface
94B Opening
95 Groove Part
96 Window Part
96A Inner Peripheral Surface

The invention claimed is:

1. A rotary electric motor comprising:
an object to be accommodated; and
a stator frame body in a cylindrical shape that accommodates the object to be accommodated, wherein
the object to be accommodated includes:
an intermediate assembly including a stator core and a rigid wiring board disposed to be opposed to the stator core in an axial direction, the rigid wiring board including a ring-shaped wiring board body and a connector mounting part projecting outward in a radial direction from the wiring board body, and
a connector to be fixed to the connector mounting part of the rigid wiring board in such a way that the connector is radially outward from and opposed to the stator core in the radial direction of the stator frame body, the connector including a contact to be soldered to the connector mounting part and a housing that holds the contact,
a groove part extending in the axial direction from an opening in the axial direction and accommodates the connector and the connector mounting part is formed in an inner peripheral surface of the stator frame body,
a window part for an opponent connector to mate with the connector accommodated in the groove part is formed in the stator frame body, and
the window part opens in an outer surface of the stator frame body and an inner surface of the groove part, and has an unbroken inner peripheral surface.

2. The rotary electric motor according to claim 1, wherein
the contact of the connector includes a board connection part to be soldered to the connector mounting part of the rigid wiring board, and
the intermediate assembly and the board connection part of the contact of the connector are both sealed with resin.

3. The rotary electric motor according to claim 1, wherein
a sealing surface in a planar shape is formed on the outer surface of the stator frame body, and
the inner surface of the groove part includes a ceiling surface parallel to the sealing surface.

4. The rotary electric motor according to claim 1, wherein
the stator frame body includes a raised part that is raised outward in the radial direction, and
the window part is formed in the raised part.

5. The rotary electric motor according to claim 1, wherein the contact is in a flat-plate shape.

6. The rotary electric motor according to claim 1, wherein the housing is provided with a pin for positioning or fixing.

* * * * *